United States Patent [19]

Morris et al.

[11] Patent Number: 5,782,222
[45] Date of Patent: Jul. 21, 1998

[54] APPARATUS AND METHOD FOR SUPPLYING AN ALTERNATE FUEL SUBSTANTIALLY SIMULTANEOUSLY TO FUEL INJECTORS

[75] Inventors: James R. Morris, Newport News; Neil D. Schoenberg, Suffolk; Jack R. Lorraine, Newport News, all of Va.

[73] Assignee: Siemens Automotive Corporation, Auburn Hills, Mich.

[21] Appl. No.: 820,203

[22] Filed: Mar. 19, 1997

[51] Int. Cl.$^6$ ........................................ F02M 37/04
[52] U.S. Cl. ........................... 123/456; 123/575; 123/468
[58] Field of Search ........................... 123/456, 575, 123/576, 577, 578, 468, 469, 470; 137/561 A, 597, 896

[56] References Cited

U.S. PATENT DOCUMENTS

| | | | |
|---|---|---|---|
| 4,450,821 | 5/1984 | Venning | 123/575 |
| 4,520,774 | 6/1985 | Sitter | 123/575 |
| 4,554,903 | 11/1985 | Straubel | 123/575 |
| 4,693,227 | 9/1987 | Satou | 123/575 |
| 4,911,116 | 3/1990 | Prohaska | 123/576 |
| 4,922,958 | 5/1990 | Lemp . | |
| 4,955,409 | 9/1990 | Tokuda | 123/456 |
| 5,117,864 | 6/1992 | Byers . | |
| 5,228,423 | 7/1993 | Otkawa | 123/575 |
| 5,233,963 | 8/1993 | Gregorius et al. . | |
| 5,299,541 | 4/1994 | Yamaguchi et al. . | |
| 5,311,850 | 5/1994 | Martin . | |
| 5,333,587 | 8/1994 | DiSilvestro et al. . | |
| 5,359,976 | 11/1994 | Nakashima et al. . | |
| 5,592,968 | 1/1997 | Nakashima et al. . | |

FOREIGN PATENT DOCUMENTS

| | | | |
|---|---|---|---|
| 2315013 | 1/1977 | France | 123/468 |
| 0088266 | 4/1988 | Japan | 123/575 |
| 4124462 | 4/1992 | Japan | 123/468 |
| 4308355 | 10/1992 | Japan | 123/468 |

*Primary Examiner*—Carl S. Miller
*Attorney, Agent, or Firm*—Russel C. Wells

[57] ABSTRACT

A fuel system is provided for supplying a second fuel different from a first supplied fuel substantially simultaneously to a plurality of injectors. In one form, an inner tube within an outer housing has a plurality of openings spaced from inlets to the fuel injectors for supplying the second fuel substantially simultaneously to each of the injectors, the number of outlets being less than the number of inlets. In a second form, the inner tube within the housing has a plurality of differently sized orifices increasing in size with increasing distance relative to the fuel inlet to the inner tube for supplying fuel substantially simultaneously to fuel injectors in registration with the orifices. In a further form, multiple inner tubes are used. In a fourth form, the main fuel supply line is divided and sub-divided through a series of T's or Y's to generate one fuel passage of equal length for each injector whereby upon changeover from the first fuel to the second fuel different from the first fuel, the second fuel is supplied substantially simultaneously to all injectors.

12 Claims, 3 Drawing Sheets

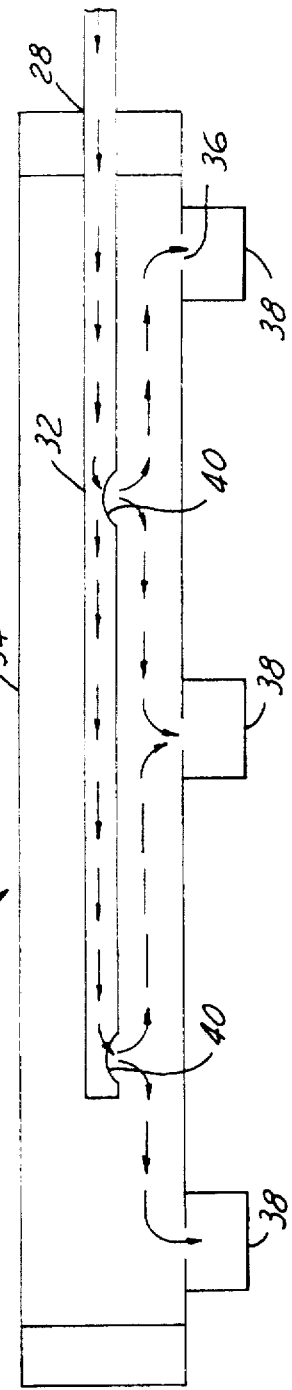
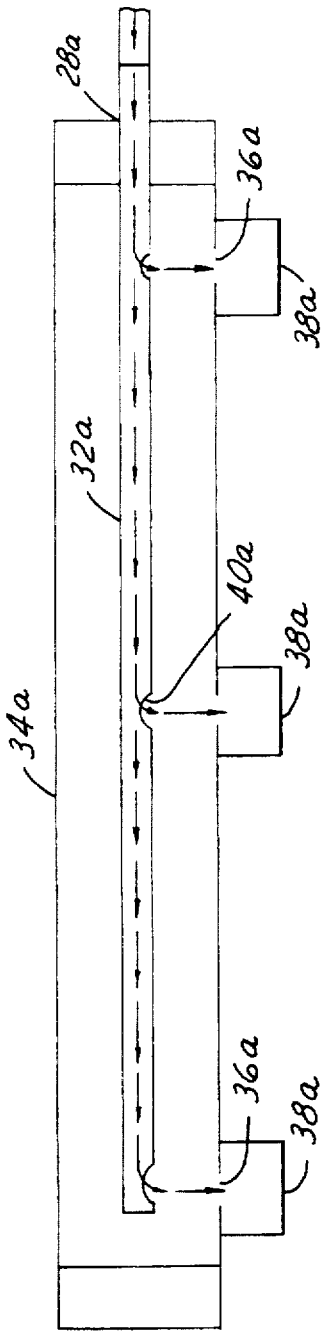
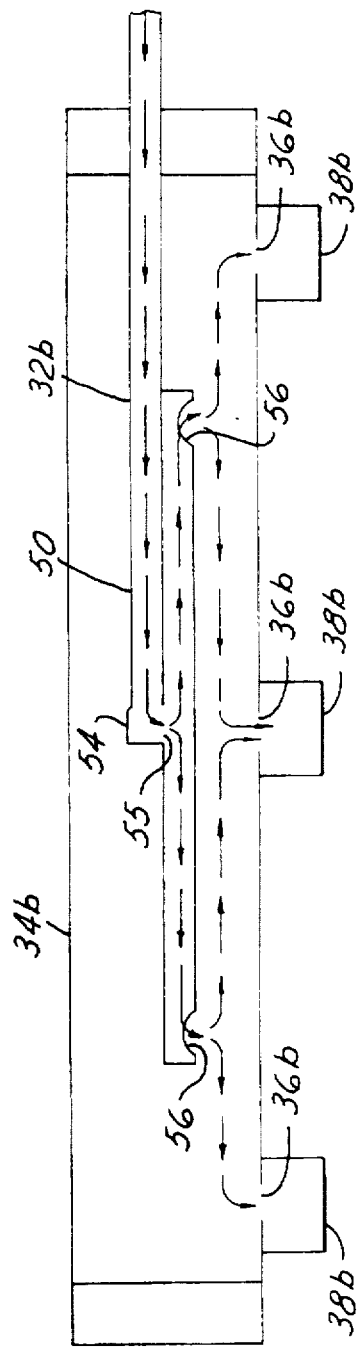
FIG. 2
FIG. 3
FIG. 4

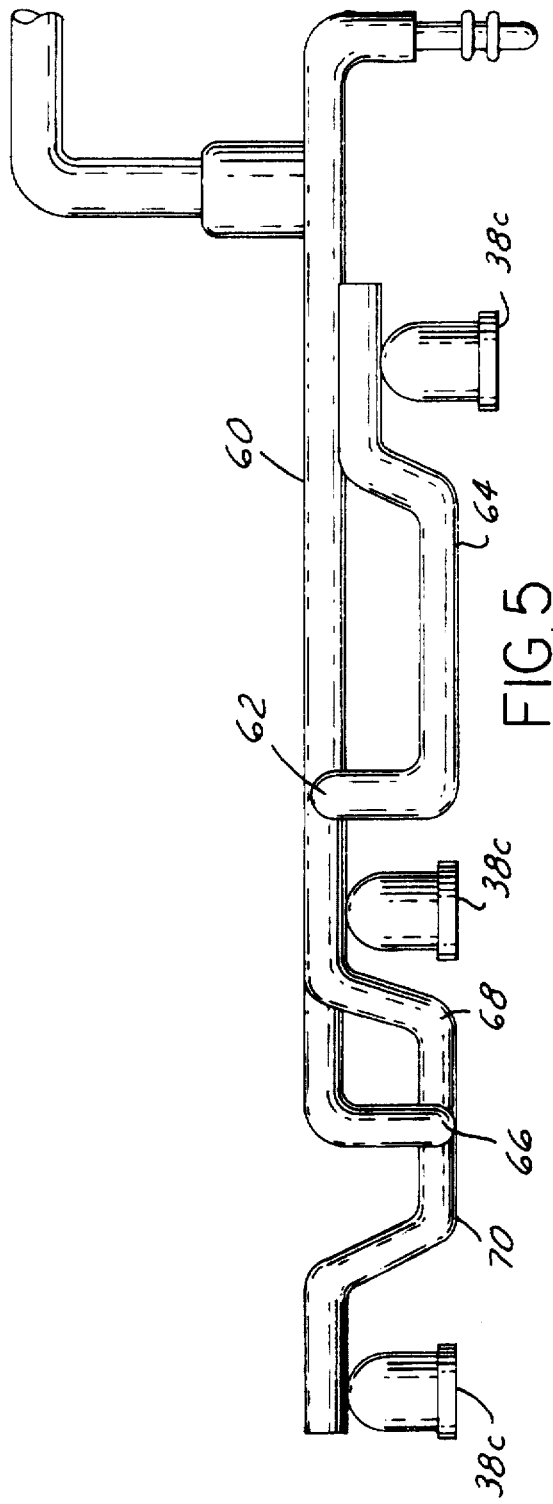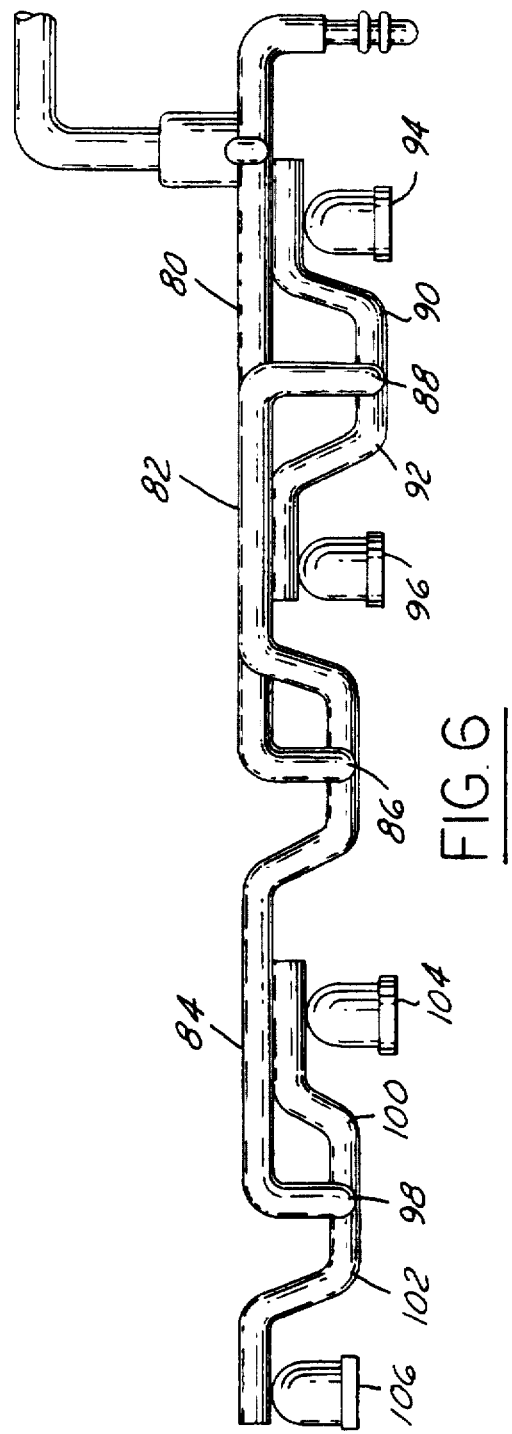

5,782,222

APPARATUS AND METHOD FOR SUPPLYING AN ALTERNATE FUEL SUBSTANTIALLY SIMULTANEOUSLY TO FUEL INJECTORS

TECHNICAL FIELD

The present invention relates to apparatus and methods for supplying a second fuel different from a first fuel substantially simultaneously to the inlet ports of fuel injectors in a fuel supply system, e.g., for a vehicle, when changing over from a first fuel to the second fuel.

BACKGROUND

Alternate fuel delivery systems are currently being developed for supplying different types of fuel to engines. For example, the fuel delivered to a vehicle engine may comprise standard unleaded gasoline. When the fuel tank is near empty, the vehicle may be supplied with a different type of fuel such as methanol or ethanol or mixtures of fuels different than the unleaded gasoline. Subsequent fill-ups may include other types of fuels different from both of these fuels and so on. It will be appreciated that systems under development for this purpose rely on a single fuel system for supplying these alternate fuels from the fuel tank to the engine. The changeover from one fuel to a different fuel, however, using conventional fuel systems, results in poor engine performance and emissions.

As a specific example, in a returnless fuel system having a fuel rail for supplying fuel to a series of fuel injectors, fuel is conventionally fed to the various injector ports from an inlet at one end of the rail. Fuel passing through the fuel rail inlet flows along the fuel rail and thus arrives at the fuel injectors in sequence. Because the same type of fuel is used in conventional fuel systems for each fuel resupply, e.g., conventional unleaded gasoline, the arrival time of the fuel passing through the fuel rail inlet to each of the injectors is of no concern.

However, in the currently designed dual-fuel systems, when there is a changeover from one fuel to a different type of fuel, the change in fuel is sensed by a sensor upstream in the fuel supply line. The sensor signals the electronic control unit (ECU) to adjust to accommodate or compensate for the new fuel. The ECU therefore changes the operating parameters of the injectors, for example, their pulse width. In the conventional fuel supply system, when the new fuel arrives at the fuel rail, it flows sequentially to the fuel injectors. Thus, the various injectors receive the new fuel at different times. The ECU, however, has already changed the injector drive program to compensate for the new fuel. The result of different fuels being supplied to different injectors at the same time is poor engine performance and emissions. As a more specific example, the fuel injectors toward the end of the fuel rail opposite its inlet end and operating with an injector program for the new fuel (while actually receiving the old fuel) may run rich and various oxygen and exhaust manifold sensors will indicate problems with engine performance and particularly emissions. In short, using conventional fuel supply systems, the injectors receive the new fuel at different times, causing two different fuels to be injected into the engine at the same time, resulting in poor engine performance and emissions.

DISCLOSURE OF THE INVENTION

In accordance with the present invention, the fuel supply system is arranged and configured such that the fuel injectors receive the new fuel at substantially the same time. This enables coordination of the new fuel delivery time with the change in the injector drive program such that the injectors operate with the new program substantially simultaneously as the new fuel is substantially simultaneously delivered to all injectors.

In a first form of the invention, the fuel rail has an outer tube and an inner tube. The outer tube includes spaced inlets for the fuel injectors. The inner tube is coupled to the main fuel supply line and has openings of substantially equal size and spaced equally between adjacent fuel injector inlets. The openings in the inner tube are one less in number than the number of fuel injector inlets. That is, for one side of a six-cylinder engine, a first opening of the inner tube is spaced between first and second fuel injector inlets, while a second opening of the inner tube is spaced between second and third fuel injector inlets. For an eight-cylinder engine, a third fuel outlet from the inner tube is spaced equally between third and fourth injector inlets. The spacing of the openings vis-a-vis the injector inlets is such that the delivery of the second fuel, upon the changeover from a first fuel to a second fuel different from the first fuel, to all fuel injector inlets occurs substantially simultaneously.

In a second form of the present invention, an inner tube has openings or outlets equal in number to the number of injector inlets and in substantial registration with the injector inlets. The sizes of the orifice outlets on the inner tube increase as their position moves farther from the fuel inlet to the fuel rail. Consequently, all injectors receive the new fuel substantially simultaneously.

In a third form of the present invention, a first inner tube supplies fuel to a second inner tube at a location equidistant between openings in the second inner tube. The openings in the second inner tube lie substantially equally between first and second injectors and second and third injectors, respectively. Consequently, when changing over to a different fuel, the new fuel is delivered substantially simultaneously to the injector inlets.

In a fourth form of the present invention, the fuel rail divides and sub-divides the fuel flow through a series of tube "T's" or "Y's" to generate one fuel passage for each injector. After each division, the fuel passage is of similar length. For example, for one side of a six-cylinder engine, the main fuel supply line has a first junction and a branch line for supplying fuel to a first injector. The main fuel supply line continues to a second junction which supplies through a pair of branch lines fuel to second and third injector inlets. The distance between the first junction and the first injector inlet is equal to the distance between the first junction and each of the second and third injector inlets whereby the new fuel will be delivered substantially simultaneously to all three injectors. In an eight-cylinder engine, the main fuel supply line supplies fuel through a first junction via first and second branch lines to supply fuel to first and second fuel injector inlets and third and fourth fuel injector inlets, respectively. The first branch line has a second junction for supplying fuel to the first and second injector inlets via first and second passageways. The second branch line has a third junction for supplying fuel to the third and fourth injector inlets via third and fourth passageways. After each division, the fuel passage is of similar length. In this manner, the new fuel is delivered substantially simultaneously to each of the fuel injectors.

In a preferred embodiment according to the present invention, there is provided a fuel supply system for delivery of a first fuel to a plurality of fuel injectors followed by delivery to the plurality of injectors of a second fuel different from the first fuel, comprising a housing having spaced inlets for supplying fuel to the respective fuel injectors and a fuel supply line within the housing having a plurality of outlets configured and arranged relative to the spaced fuel inlets to supply via the housing the second fuel, different from the first fuel, substantially simultaneously to the inlets to the fuel injectors when changing over from the first fuel to the second fuel.

In a further preferred embodiment according to the present invention, there is provided a fuel supply system for delivery of a first fuel to a plurality of fuel injectors followed by delivery to the plurality of injectors of a second fuel different from the first fuel, comprising a main fuel supply line and means coupled to the main fuel supply line for supplying the second fuel substantially simultaneously to the plurality of injectors when changing over from delivery of the first fuel to the plurality of injectors to delivery of the second fuel to the plurality of injectors.

In a still further preferred embodiment according to the present invention, there is provided a fuel supply system for delivery of a first fuel to a plurality of fuel injectors followed by delivery to the plurality of injectors of a second fuel different from the first fuel, comprising a main fuel supply line, first, second and third branch fuel lines coupled to the main fuel supply line for supplying fuel to each of at least first, second and third fuel injectors, respectively, a first junction in the main fuel supply line for supplying fuel through the first branch fuel line to the first fuel injector and supplying fuel through the second and third branch fuel lines to the second and third injectors, the fuel flow distance between the first junction and the one fuel injector along the first branch fuel line being substantially equal to the flow distances between the first junction and each of the second and third fuel injectors including along the second and third branch fuel lines, respectively, thereby enabling substantially simultaneous delivery of the second fuel different from the first fuel to each of the first, second and third injectors when changing from delivering the first fuel to delivering the second fuel.

In a still further preferred embodiment according to the present invention, there is provided a fuel supply system for delivery of a first fuel to a plurality of fuel injectors followed by delivery to the plurality of injectors of a second fuel different from the first fuel, comprising a main fuel supply line, first and second branch fuel lines coupled to the main supply line for supplying fuel to the first and second fuel injectors and the third and fourth fuel injectors, respectively, a first junction in the main fuel supply line for supplying fuel through the first and second branch lines, the first branch line having a second junction and first and second passageways for supplying fuel from the second junction to the first and second injectors, respectively, the second branch line having a third junction and third and fourth passageways for supplying fuel from the third junction to the third and fourth injectors, the fuel flow distances between the first junction and the first and second injectors, respectively, along the first branch fuel line and the first and second passageways being substantially equal to the fuel flow distances between the first junction and the third and fourth fuel injectors, respectively, along the second branch fuel line and the third and fourth passageways thereby enabling substantially simultaneous delivery of the second fuel different from the first fuel to each of the first, second, third and fourth injectors when changing from delivering the first fuel to delivering the second fuel.

In a still further preferred embodiment according to the present invention, there is provided in a fuel supply system having a plurality of fuel injectors, a method of delivering a first fuel to a plurality of fuel injectors followed by delivery to the plurality of injectors of a second fuel different from the first fuel, comprising the step of supplying the second fuel substantially simultaneously to the plurality of injectors when changing over from delivery of the first fuel to the plurality of injectors to delivery of the second fuel to the plurality of injectors.

Accordingly, it is a primary object of the present invention to provide apparatus and methods for substantially simultaneously delivering a second fuel different from a first fuel to a plurality of fuel injector inlets whereby the changeover from the first fuel to the second fuel is accomplished substantially simultaneously enabling coordination with the change in the injector driver program thereby maintaining engine performance.

BRIEF DESCRIPTION OF THE DRAWINGS

FIGS. 2, 3 and 4 are schematic illustrations of a fuel rail system according to the present invention; and FIGS. 5 and 6 are further embodiments of a fuel supply system according to the present invention for delivering a second fuel substantially simultaneously to fuel injectors in respective six-cylinder and eight-cylinder engines.

BEST MODE FOR CARRYING OUT THE INVENTION

Figure 1:
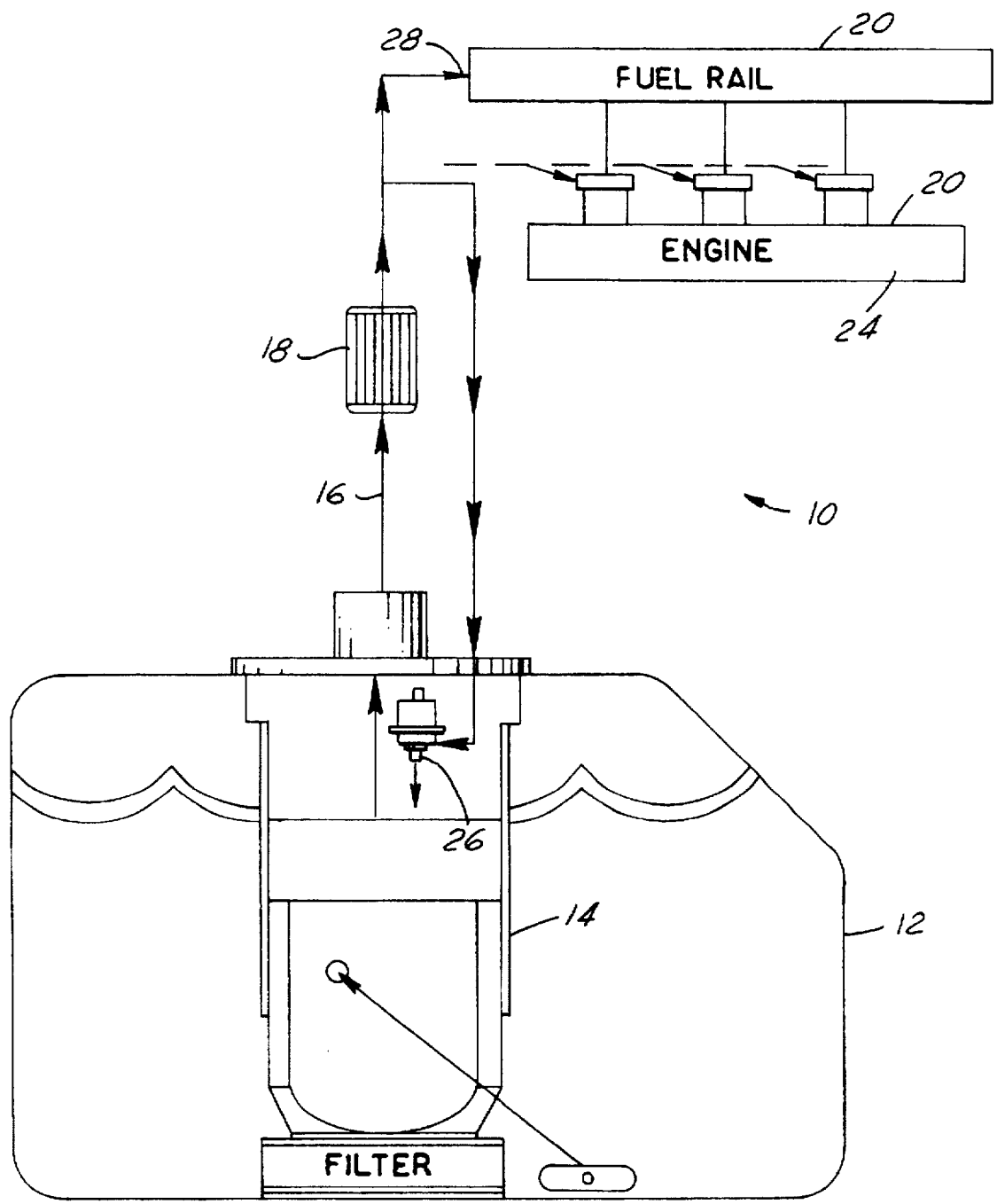
FIG. 1 is a general schematic view of a prior art returnless fuel system.

Referring now to FIG. 1, there is illustrated a returnless fuel system, generally designated 10, comprised of a fuel tank 12 containing a fuel pump module 14 within the tank, and a main fuel supply line 16 for supplying fuel via a fuel filter 18 to a fuel rail 20. The fuel rail supplies fuel to the individual injectors 22 of the engine 24. A pressure regulator 26 resides within the fuel pump module 14 for receiving return flow from the main fuel supply line. As can be seen from this schematic drawing figure, the typical fuel rail has a fuel inlet 28 at one end of the fuel rail whereby fuel passing through the inlet is supplied at different times to the inlets to the fuel injectors 22.

As noted above, during a changeover from a first fuel to a second fuel different from the first fuel, the second or new fuel, with the arrangement illustrated in FIG. 1, would arrive at the injectors at different times, causing two different fuels to be injected at the same time into the engine. The injector drive program, however, changes the operating characteristics of the injectors simultaneously and, accordingly, the different fuels would be supplied to the various injectors when the injectors are programmed to receive only the second type of fuel.

The objective of the present invention is thus to provide a second fuel, different from a first fuel, substantially simultaneously to a plurality of fuel injectors. To accomplish that and referring now to FIG. 2, there is provided a fuel rail, generally designated 30, having inner and outer tubes 32 and 34, respectively, constructed to maintain their fuel volumes to a minimum. Inlets 36 to the injectors 38 are provided through the outer tube 34. As illustrated, the inlets 36 to the fuel injectors 38 are substantially equally spaced along the outer tube 34. The inner tube 32 has one less opening 40 than the number of inlets 36 to injectors 38. The openings 40 are of equal size and are located between adjacent pairs of the inlets 36 to the fuel injectors 38, respectively. With this arrangement, upon changeover from a first fuel to a second fuel different than the first fuel, the second fuel is delivered to the inlets of the fuel injectors substantially simultaneously and that event may therefore be coordinated with the changeover in the injector drive program for the ECU. While a fuel rail having three injectors is illustrated and is useful for one side of a six-cylinder engine, it will be appreciated that for eight-cylinder engines, the fuel rail may have an additional injector for each side of the engine. In that configuration, of course, the inner tube 32 would have an additional opening, i.e., three equal-sized openings with four injectors. The spacing of the opening relative to the inlets for the fuel injectors is such that the changeover from one fuel to the other affords substantially simultaneous delivery of the new fuel to all of the fuel injectors.

Referring to FIG. 3, wherein like reference numerals apply to like parts, followed by the suffix "a," the outer tube 34a has a plurality of fuel injectors 38a and fuel inlets 36a to the injectors 38a. The inner tube 32a has a plurality of openings 40a. The number of openings 40a is equal to the number of inlets 36a to the fuel injectors. In this form, however, the orifice size of the outlets on the inner tube 32a increases as the location of openings 40a are further distanced from the fuel inlet 28a. Moreover, each outlet 40a lies in registration with a fuel inlet 36a for a fuel injector 38a. The changeover in fuel from a first fuel to a second fuel different than the first fuel thus occurs substantially simultaneously with respect to each of the injectors 38a. As in the previous embodiment, the illustration in FIG. 3 refers to one side of a six-cylinder engine and this embodiment has applicability also to an eight-cylinder engine by providing an additional fuel injector, fuel inlet and opening of an appropriate size in the inner tube in registration with the additional injector.

Referring now to the form of the invention illustrated in FIG. 4 wherein like reference numerals are applied to like parts, followed by the suffix "b," there is illustrated an outer tube 34b and an inner tube assembly comprised of a first inner tube 50 connected to a second inner tube 52. The inner end 54 of the first inner tube 50 lies in communication through an opening 55 with the second inner tube 52 substantially medially between its ends. The second inner tube 52 has openings 56 adjacent opposite ends. The openings 56 are disposed between the first and second injectors and the second and third injectors, respectively. The exact position of the openings 56 is determined by the requirement to flow a second fuel substantially simultaneously to each of the fuel inlets 36b of the injectors 38b during a changeover from a first fuel to a second fuel different than the first fuel.

Referring now to FIG. 5, there is illustrated a simplified fuel supply system for supplying a second fuel substantially simultaneously to fuel injectors during changeover from a first fuel to a second fuel different than the first fuel. In this form, there is provided a main fuel supply line 60 having a first junction 62 in communication with a branch line 64 for supplying fuel to a first fuel injector 38c. The main fuel supply line 60 continues downstream beyond junction 62 to a second junction 66 for flowing fuel through second and third branch fuel lines 68 and 70 to the respective second and third injectors 38c. The main fuel supply line and branch lines are arranged and configured such that the fuel flow distance between the first junction 62 and the first fuel injector 38c along the first branch fuel line 64 is substantially equal to the flow distances between the first junction 62 and each of the second and third fuel injectors 38c, including along the second and third branch fuel lines, respectively. In this manner, a second fuel different from a first fuel flowing through the main fuel supply line 60 is delivered substantially simultaneously to each of the first, second and third injectors when changing over from the first fuel to the second fuel.

Referring now to FIG. 6, the main fuel supply line 80 is connected at its terminus to first and second branch lines 82 and 84 at a first junction 86. Branch line 82 is coupled by way of a second junction 88 and discrete first and second passageways 90 and 92, respectively, to first and second fuel injectors 94 and 96. The second branch line 84 is connected via a third junction 98 and third and fourth passageways 100 and 102 with third and fourth fuel injectors 104 and 106. It will be appreciated that the arrangement illustrated in FIG. 6 is for one side of an 8-cylinder engine. From a review of FIG. 6, it will be appreciated that after each division, i.e., after the first junction 86, as well as after each of the second and third junctions 88 and 98, the remaining fuel passages to the injectors are of equal length. Thus, the distances from the first junction 86 to each of the first, second, third and fourth fuel injectors 94 and 96 are substantially equal to one another. The distances between the second junction 88 and the first and second fuel injectors 94 and 96 are equal to one another. Likewise, the distances between the third junction 98 and the third and fourth fuel injectors 104 and 106 are equal to one another. In this manner, when changing over from a first fuel to a second fuel different from the first fuel, the second fuel is supplied to each of the four injectors substantially simultaneously.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel supply system for delivery of a first fuel to a plurality of fuel injectors followed by delivery to said plurality of injectors of a second fuel different from said first fuel, comprising:

a housing having spaced inlets for supplying fuel to the respective fuel injectors; and a fuel supply line within said housing having a plurality of outlets configured and arranged relative to said spaced fuel inlets to supply via the housing the second fuel, different from the first fuel, substantially simultaneously to the inlets to the fuel injectors when changing over from the first fuel to the second fuel.

2. A system according to claim 1 wherein the outlets of said fuel supply line within said housing are less in number than the number of inlets to the fuel injectors.

3. A system according to claim 1 wherein each outlet of said fuel supply line within said housing is spaced between a pair of inlets to the injectors to enable substantially equal quantities of fuel flowing from each outlet to flow to said inlets.

4. A system according to claim 3 wherein the outlets of said fuel supply line within said housing are less in number than the number of inlets to the fuel injectors.

5. A system according to claim 1 including an inlet to said supply line for supplying fuel thereto, the number of outlets of said fuel supply line being equal to the number of inlets to the fuel injectors and the distance between each outlet and a corresponding fuel injector inlet being substantially the same, the size of the outlets along said supply line increasing with increasing distance from the inlet to the supply line.

6. A system according to claim 1 wherein said fuel supply line includes a first supply tube and a second supply tube, each within said housing, said second supply tube having at least two outlets configured and located for supplying a substantially even distribution of fuel to at least three inlets of said injectors, said first supply tube having an outlet in communication with said second supply tube and substantially medially between said outlets of said second supply tube.

7. In a fuel supply system having a plurality of fuel injectors, a method of delivering a first fuel to the plurality of fuel injectors followed by delivery to said plurality of injectors of a second fuel different from said first fuel, including a housing having spaced inlets for supplying fuel to the fuel injectors and a fuel supply line within said housing having a plurality of outlets, and further comprising the step of supplying said second fuel through said outlets to said spaced fuel inlets via said housing substantially simultaneously to said plurality of injectors when changing over from delivery of the first fuel to the plurality of injectors to delivery of the second fuel to the plurality of injectors.

8. A method according to claim 7 including providing a lesser number of the outlets of said fuel supply line within said housing than the number of inlets to the fuel injectors.

9. A method according to claim 7 including spacing each outlet of said fuel supply line within said housing between a pair of inlets to the injectors to enable substantially equal quantities of fuel flowing from each outlet to flow to said inlets.

10. A method according to claim 9 including providing a lesser number of the outlets of said fuel supply line within said housing than the number of inlets to the fuel injectors.

11. A method according to claim 7 including providing an inlet to said supply line, providing a number of outlets in said fuel supply line equal to the number of inlets to the fuel injectors, spacing each outlet and a corresponding fuel injector inlet substantially the same distance from one another and providing outlets increased in size along said supply line with increasing distance from said inlet to the supply line.

12. A method according to claim 11 including a housing having spaced inlets for supplying-fuel to the fuel injectors and first and second supply tubes within said housing, providing at least two outlets in said second supply tube configured and located for supplying a substantially even distribution of fuel to at least three inlets of said injectors, providing an outlet in said first supply tube in communication with said second supply tube and substantially medially between said outlets of said second supply tube.

* * * * *